United States Patent [19]
Schnieders

[11] Patent Number: 5,170,816
[45] Date of Patent: Dec. 15, 1992

[54] TEMPERATURE AND PRESSURE MULTIPLE MEMORY FOR FAUCETS

[76] Inventor: Daniel J. Schnieders, 6506 Barton Cir. Apt. #204, Shawnee, Kans. 66203

[21] Appl. No.: 686,183

[22] Filed: Apr. 16, 1991

[51] Int. Cl.⁵ ............................................. F16K 37/00
[52] U.S. Cl. .................... 137/556.6; 116/277
[58] Field of Search ................... 137/556, 556.3, 556.6; 116/277

[56] References Cited

U.S. PATENT DOCUMENTS

| | | | |
|---|---|---|---|
| 3,913,607 | 10/1975 | Price | 137/556.6 |
| 4,718,445 | 1/1988 | Lundberg | 137/556 X |
| 4,742,848 | 5/1988 | Black | 137/556.3 |

*Primary Examiner*—Robert G. Nilson

[57] ABSTRACT

A stationary "standard" mark and multiple variable marks on a rotor can be matched to one stationary "standard" mark on an adjacent stator throughout valve movement. All marks can be color and touch coded, and each variable mark can be anchored by a slot. The connection between the rotor and stator sections allow rotation about a common axis of the rotor relative to the stator. The connected stator is anchored to a protruding pipe or outer sleeve of a valve stem. The rotor can be attached to a valve stem and can double as a faucet handle. When a temperature and pressure is obtained, it can be set in memory by sliding a variable mark to match the stationary "standard" mark on the stator. The two "standard" marks can be matched when a common bathing temperature and pressure is desired. The color and touch coded marks enable people with good sight, poor sight, and blind people to use the device.

2 Claims, 2 Drawing Sheets

TEMPERATURE AND PRESSURE MULTIPLE MEMORY FOR FAUCETS

BACKGROUND OF THE INVENTION

1. Field of the Invention

This invention relates generally to faucets, particularly to the control of water temperature and pressure by a device attached to a valve arrangement allowing specific colored marks to match even throughout valve movement, thus accurately regulating water temperature and pressure to desirable settings.

2. Description of Related Art

Monotonous adjustment of bath water for the correct temperature and pressure on a day after day basis is common. In the past, faucets had to be adjusted to the desired temperature and pressure with each use. There is a need for an accurate and more reliable temperature and pressure multiple memory device that can be easily used by sight or touch, and for a "standard", easily recognizable, mark for the most common bathing temperature and pressure.

Basically, there are four popular types of faucets. The first one being the conventional two handled faucet, one handle for hot and the other for cold. It is adjusted by turning the handles clockwise or counter-clockwise. The second type is a single handled faucet, one handle for both hot and cold. It is adjusted by pulling the handle out for pressure and turning the handle clockwise or counter-clockwise for temperature. The third type is also a single handled faucet, similiar to type 2, but the handle is anchored to a hemishere about which it can be moved. It is adjusted by pushing the handle up for pressure and turning clockwise or counter-clockwise for temperature. The fourth type is also a single handled faucet, one handle for both hot and cold. It is similar to type 1 in that when the handle is turned all the way clockwise it is off and counter-clockwise it is on. The difference is, since it is a single handled faucet, as the handle is turned counter-clockwise the temperature increases from cold to hot. It is believed that throughout this range the pressure is basically constant.

There is a single handled faucet, type 2, available by Moen that can remember only one temperature setting and not the pressure at all. The Moen handle does not use marks. To remember the temperature, the user would have to carefully push the handle directly in to turn the faucet off, and with no other uses of different temperatures in between, pull the handle directly back out to turn the faucet on again to the same temperature. If, for example, somebody had used the shower and did not perform the above procedure, the prior setting would be lost. The prior showerer could not easily recognize the handle position change and could be startled by the change in temperature. They would then have to readjust the temperature using trial and error, wasting human time and energy and out natural resources of fuel and water.

Another type 4 faucet by Price Pfister can aid you in recalling a previously used temperature by matching up a mark on the handle with a mark on the wall. But to enable the use of the device, you would have to remember and count a number of marks on the wall to your desired temperature setting. While counting to find the desired setting, the handle is turned on to match the mark on the wall; however, it can be difficult to match the mark on the handle to the mark on the wall since they are approximately 0.5 inches apart, thus requiring the same line of sight or view each time you use the device. In addition, the marks on the wall are approximately separated by ⅛ inches of "no mans land" of space, meaning there is no corresponding wall mark to match with the mark on the handle.

An adjustable temperature limit control valve "ultrasafe" of T&S Brass and Bronze Works is available that limits the temperature to a desired setting for use in institutions to prevent scalding.

U.S. Pat. No. 4,718,445 to Lundberg describes an adhesive applied to the valve stem and the housing and then severed between the two. In a faucet environment, the rotor valve actuater shaft and a stationary surface are not contiguous, thus presenting the line of sight problem as described above. If it were accessible, the strip would either dwarf the small valve stem or the strip would be too small to read. Also, the strip can not be adjusted if a person wanted a hotter or colder bathing temperature due to a change in seasons, for example.

No temperature or pressure memory device for type 1 faucets is known of whatsoever. No device is known of for type 2 faucets with multiple or retrievable temperature memory or pressure memory. No temperature or pressure memory device for type 3 faucets is known of whatsoever. No device is known of for type 4 faucets with multiple, easy, or accurate retrievable temperature memory. No device for pressure memory is known. No temperature and pressure memory device is known of where multiple lines of sight or touch can be used, or employing a "standard" mark for a common bathing temperature and pressure.

SUMMARY OF THE INVENTION

The principle object of the present invention is to provide a device and method for use on faucets to remember multiple previously used temperature and pressure settings accurately, thus saving human time and energy, and the natural resources of fuel and water. Accurately here meaning more accurate than the prior art, because the marks of this invention are contiguous even during valve movement i.e. screw valve type 1 and push/pull valve type 2 etc.

Another object is to provide such a device that can be used without the use of eye wear or can be used by blind people.

It also is an object of the present invention to provide such a device which is aesthetically appealing, easy to install, use, clean, and does not attract or harbour dirt or water residue.

A further object is to provide such a device which will have "standard" markings, recognized by sight and/or touch, set to a common bathing temperature and pressure. The "standard" would be very useful to people using showers, sinks etc. unfamaliar to them. For example, motels and hotels where customers have never used the faucets and would have to go through trial and error to find their desired temperature and pressure. A "standard" temperature and pressure mark would make it easier to find a desired temperature and pressure, or they could easily use the "standard" setting itself.

The foregoing objects can be accomplished by providing a multiuser memory device having one stationary "standard" mark and multiple variable marks, color and touch coded, on a rotor matching to one stationary "standard" mark on an adjacent stator. In the preferred embodiment of the invention, the rotor and stator are formed of tubular sections. The stator section is fitted in the rotor so as to share a common axis. The connection between the rotor and stator sections allow rotation about this common axis of the rotor relative to the stator. In the case of the preferred embodiment, the present handles on a faucet would be removed and the device installed as follows. A base is attached to a stationary surface, such as the protruding pipe or outer sleeve of the valve stem. The stator end of the device is then slid onto the base, and the rotor is attached to the valve stem and doubles as a faucet handle.

For example, once installed, a person taking a shower would adjust the temperature and pressure to a desired setting. A variable mark would then be detachably secured on the rotor to match the stationary "standard" mark on the stator. This sets the memory and the shower could be turned off. When ready to shower at the same temperature and pressure, the user would just match the marks.

DETAILED DESCRIPTION

Figure 1:
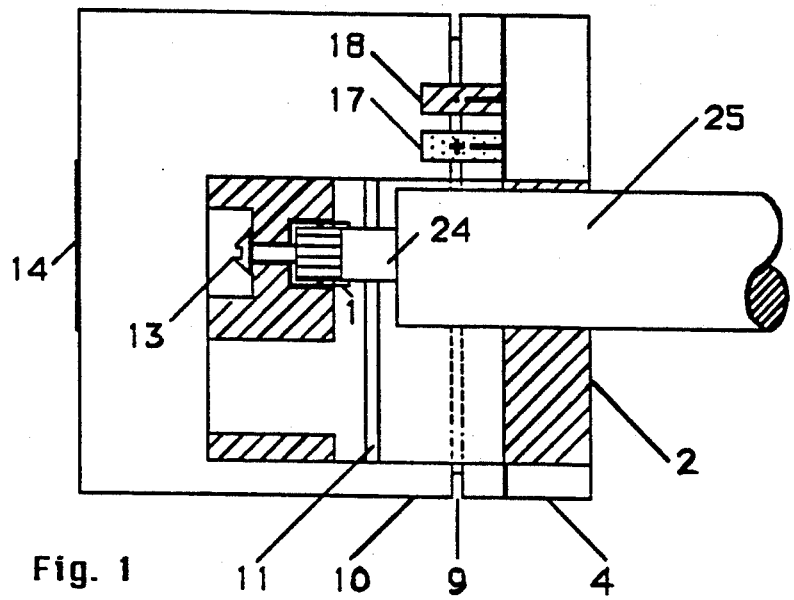
FIG. 1 is a cut away top view of the valve arrangement embodying the present invention.
Figure 3:
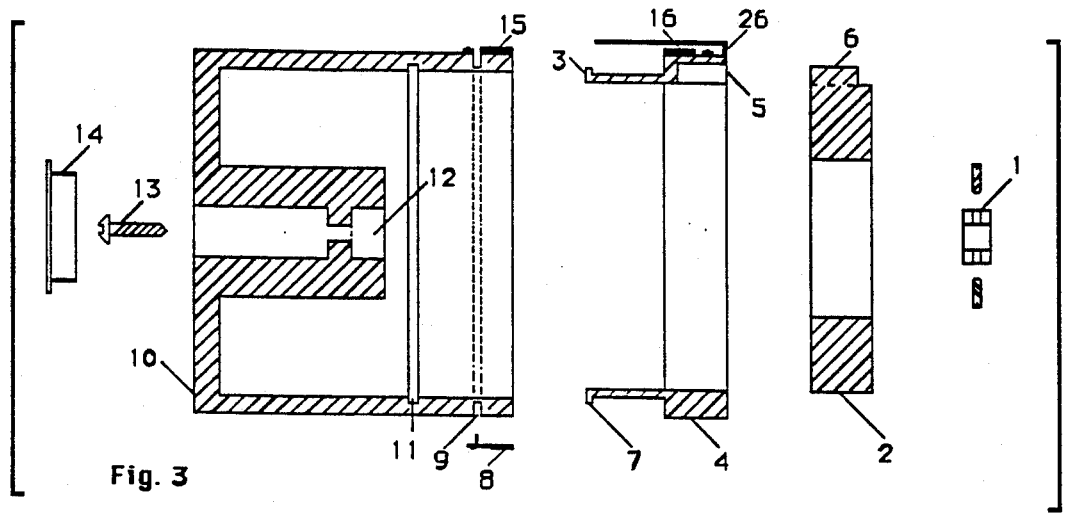
FIG. 3 is a cross-sectional exploded view of the device of FIG. 2.

Referring to FIG. 1, before the device is installed, the valve stem 24 needs to be exposed. This, in most cases, will require removal of the existing handle. As shown in FIG. 3, the preferred temperature and pressure multiple memory device in accordance with the present invention includes a universal clamp 1 needed to standardize varying valve stem configurations, allowing them to fit the uniform cavity 12. The universal clamp 1 is secured by three inset screws and fits over a valve stem of a faucet.

As shown in FIG. 3, the preferred temperature and pressure multiple memory device in accordance with the present invention includes a base 2 of doughnut shape which may be made of flexible foam rubber. The base 2 is hollow so that it may be slid onto a pipe or outer sleeve of valve stem 25, as seen in FIG. 1. Ridge 6, on base 2, will slide into canal 5 and prevent rotation of tubular stator section 4 when tubular rotor section 10 rotates, but will allow the stator section 4 to move in and out with rotor section 10. This in and out movement is caused by the screw type valve. The base 2 will allow rotation about the pipe with preferably hand torque, allowing easy calibration of the stationary "standard" marks during installation. Lips 3 and 7 on the end of tubular stator section 4 would be flexible enough to slide into the tubular rotor section 10 and snap into slot 11. This would hold flush and help center, but with low friction, the tubular stator section 4 to the tubular rotor section 10.

The inner end portion of the tubular section 10 is of increased diameter for a snug, but with low friction, fit, receiving lips 3 and 7 of the tubular stator section 4 allowing them to rotate independently about their common axis. Preferably, the outer surface of the tubular stator section 4 is flush with the outer surface of the tubular rotor section 10, to create one surface. Near the end of the outer portion of the tubular rotor section 10, a variable mark 8 can be inserted in slot 9. Slot 9 encircles and is perpendicular to the surface of tubular rotor section 10. A stationary "standard" mark 15, faces an identical stationary "standard" mark 16, each so as to match, is preferably secured by attachment means on the outer portion of the tubular rotor section 10 by slot 9. Likewise, a stationary "standard" mark 16 that faces an identical stationary "standard" mark 15, so as to match, is preferably secured by attachment means on the outer portion of the tubular stator section 4.

The universal clamp 1 is fitted to the center cavity 12 of the tubular rotor section 10. A screw 13 is applied through the hole normally closed by the plug 14, to the center of a valve stem, anchoring the device.

Figure 4:
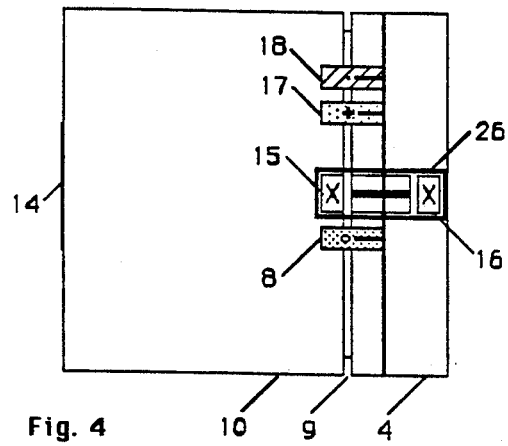
FIG. 4 is a top view of such a device.

Referring to FIG. 4, variable mark 8 will function mechanically the same as a multiple of other variable marks 17 and 18, for example. But the variable marks differ in look and feel compared to the stationary "standard" marks. Both the variable marks and stationary "standard" marks are touch and sight coded, meaning they have different colors and raised symbols such as Braille markings. The stationary "standard" mark could have the symbol "wx" and/or information pertaining to the common bathing temperature and pressure, such as actual temperature and pressure numbers and instructions. A magnifying device 26 could be placed over the marks for simple legibility.

The rotor and stator sections and variable marks may be made of durable plastic such as polyvinylchloride (PVC).

Having described the preferred version for two handled faucets above, at least two other faucet types can use similiar mechanics as the preferred embodiment. The first alternative type is a faucet that turns on by pulling out the handle for water pressure, and turning the handle clockwise and counter-clockwise for temperature control. The memory device for this type faucet is basically the same as the aforementioned, but has at least the following differences.

Figure 2:
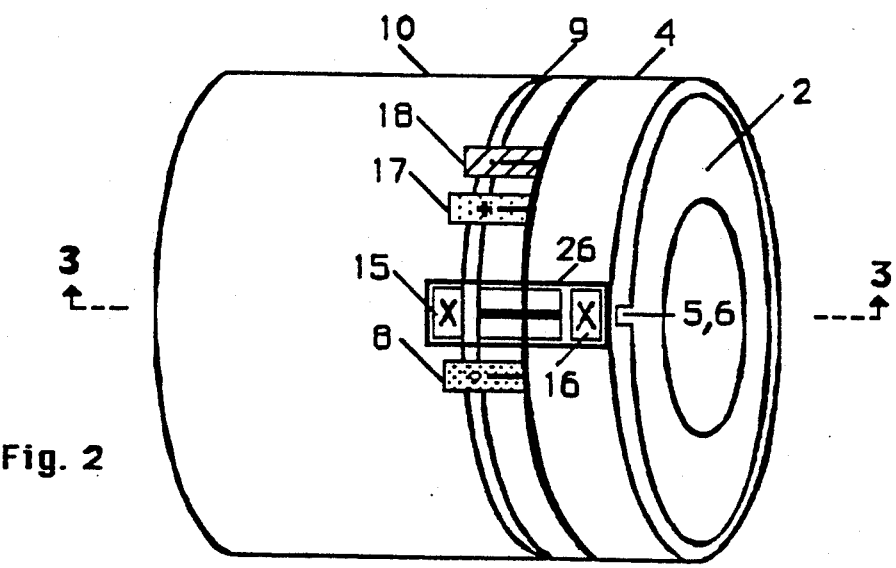
FIG. 2 is a top perspective view of a temperature and pressure multiple memory device in accordance with the present invention.
Figure 5:
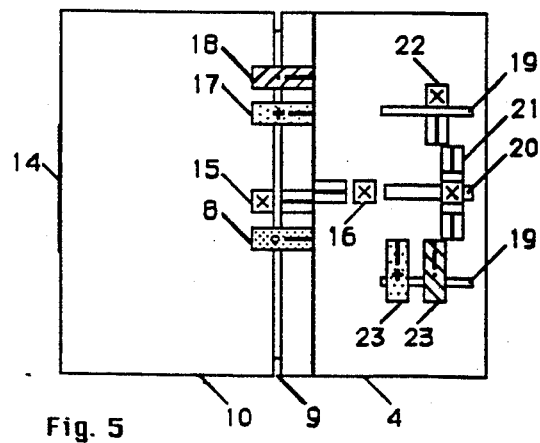
FIG. 5 is a top view of a modified temperature and pressure memory device for type 2 faucet.

Referring to FIG. 5, the base of the preferred version is replaced with preferably an extendable restricting rod. The extendable restricting rod is anchored with a clamp to a pipe or outer sleeve of a valve stem. The extendable restricting rod could be extended to account for diameter differences of the pipe to which the rod is anchored. The rod would be extended through slot 20 enough to be able to match with a stationary "standard" mark 22. On the outer end of the rod there would be a stationary "standard" mark 21. Variable marks 23 could be placed in slots 19. Variable marks and stationary "standard" marks could function as described in the preferred embodiment. The restricting rod could allow the stator section 4 to move in or out with the rotor section 10 for change in water pressure, but restrict clockwise and counter-clockwise movement for temperature change. Temperature would be marked in the same fashion as above. Pressure would be marked using variable marks matched to the stationary "standard" mark 21. Lips 3 and 7 in conjunction with slot 11, of FIG. 2, would hold the tubular stator section 4 to the tubular rotor section 10, when section 10 is pushed and pulled to regulate water pressure.

The other type is also a single handled faucet, one handle for both hot and cold. It is similiar to type 1 in that when the handle is turned all the way clockwise it is off and counter-clockwise it is on. The difference is, being a single handled faucet, as the handle is turned counter-clockwise the temperature increases from cold to hot. It is believed that the preferred device would work for this type of faucet.

Other alternatives are to attach the device to an existing handle and valve housing, or to sell it with the whole faucet assembly, i.e. spout, valve stems, handles, etc.

A thermometer and pressure gauge could accompany the memory device to calibrate, during installation, the stationary "standard" marks 15 and 16 to a common "standard" bathing temperature and pressure. This would allow anyone to take a "standard" shower, for example, by matching the stationary "standard" marks 15 and 16.

Once installed and in use, preferably, a variable mark can be slid along slot 9 to any position on the mark end portion of the tubular rotor section 10. When a user turns on a faucet to obtain a desired temperature and pressure to be remembered, a variable mark is inserted in slot 9 and matched with the stationary "standard" mark 16, for example. This sets the memory. The user would then turn off the faucet. Next time that temperature and pressure is required, the user need only recall the color or touch coded preset variable mark to match with the stationary "standard" mark. If there are no other variable marks in use, for example to mark other family members shower temperature and pressure or for cleaning purposes, just match the variable mark in use to the stationary "standard" mark. Of course, in the preferred embodiment, both the hot and the cold stems each have a memory device.

The foregoing description of the preferred embodiment of the invention has been presented for the purpose of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. In combination:
   a) a stator section having attachment means for attachment to a fixed structure, and
   b) a rotor section having attachment means for attachment to a valve arrangement, and
   c) a variable mark, attached to said stator section, and
   d) a variable mark, attached to said rotor section, and
   e) said variable marks meet as to match when a predetermined setting is desired, whereby a human being turning on a faucet can easily recall a previously used bathing temperature and pressure, and
   f) a magnifying means over said variable marks to enhance the marks visibility.

2. In combination:
   a) a restricting fixture attached to a fixed structure, restricting a stator section from clockwise and counter-clockwise movement, but allowing said stator section to move in and out, and
   b) a rotor section having attachment means for attachment to a valve arrangement, and
   c) a variable mark, attached to said stator section, and
   d) a variable mark, attached to said rotor section, and
   e) said variable marks meet as to match when a predetermined setting is desired, whereby a human being turning on a faucet can easily recall a previously used bathing temperature and pressure.

* * * * *